United States Patent
Cheng

[19]

[11] Patent Number: 6,099,019
[45] Date of Patent: Aug. 8, 2000

[54] LOCKUP MECHANISM FOR AN INFANT STROLLER

[76] Inventor: Kenny Cheng, No. 16, Lane 47, Chih Feng St., Taipei, Taiwan

[21] Appl. No.: 09/457,055

[22] Filed: Dec. 7, 1999

[30] Foreign Application Priority Data

Jun. 21, 1999 [CN] China ................................ 99 2 13399

[51] Int. Cl.⁷ ...................................................... B62B 1/00
[52] U.S. Cl. ........................ 280/642; 280/658; 280/47.38
[58] Field of Search ................................ 280/639, 38, 39, 280/641, 642, 647, 651, 657, 658, 47.38, 47.41

[56] References Cited

U.S. PATENT DOCUMENTS

| | | | |
|---|---|---|---|
| 5,460,398 | 10/1995 | Huang | 280/642 |
| 5,605,409 | 2/1997 | Haut et al. | 280/642 |
| 5,645,293 | 7/1997 | Cheng | 280/642 |
| 5,775,718 | 7/1998 | Huang | 280/642 |
| 5,865,460 | 2/1999 | Huang | 280/642 |

FOREIGN PATENT DOCUMENTS

| | | | |
|---|---|---|---|
| 2603240 | 3/1988 | France | 280/642 |
| 2700515 | 7/1994 | France | 280/642 |

*Primary Examiner*—Richard M Camby
*Attorney, Agent, or Firm*—Salter & Michaelson

[57] ABSTRACT

A lockup mechanism for an infant stroller comprises a lockup member having a protrusion at one end thereof and a cavity at the other end thereof and received in a rear leg of the stroller to be movable between a first position where the protrusion is retreated inside the rear leg and a second position where the protrusion is protruded outside the rear leg; and a spring provided in the cavity of the lockup member for biasing the lockup member towards the second position, wherein when the frame of the stroller is in the collapsed position, the rear leg can be fixed with respect to the joint by the lockup member biased toward the second position by the spring so that the protrusion of the lockup member abuts against the joint, and the rear leg can be released to rotate freely with respect to the joint by moving the lockup member from the second position to the first position against a biasing force of the spring so that the frame can be moved from the collapsed position to the operating position.

4 Claims, 5 Drawing Sheets

LOCKUP MECHANISM FOR AN INFANT STROLLER

FIELD OF THE INVENTION

The present invention relates to an infant stroller, and more particularly to a lockup mechanism which is used to secure an infant stroller in a collapsed position when the infant stroller is not in use.

BACKGROUND OF THE INVENTION

Most of strollers available in the market today are not provided with such a mechanism that a stroller can be secured in a collapsed position. The stroller is often carried from one place to another, e.g., from a house to a car, and when a user goes shopping with his or her infant, the stroller must be secured in the collapsed position and carried into the car by the user. To secure the stroller in the collapsed position, in general, as shown in FIG. 5, a fixing member 6 is used to fix a handle bar 1 and a rear leg 2 of the stroller by putting C-shaped grooves provided at both ends of the fixing member 6 around the handle bar 1 and the rear leg 2. The fixing member is normally made of plastic material and thus the C-shaped grooves thereof break easily during operation.

SUMMARY OF THE INVENTION

Accordingly, in order to overcome the above-mentioned drawback, it is a primary object of the invention to provide a lockup mechanism for an infant stroller which allows the stroller to be secured in a collapsed position when the stroller is folded up. The infant stroller includes a frame movable between a collapsed position and an operating position, wheels connected with the frame, and a seat connected with the frame for supporting an infant, the frame having a handle bar, two front legs and two rear legs, wherein each of the two rear legs is pivotably connected to the handle bar by a joint. The lockup mechanism comprises a lockup member having a protrusion at one end thereof and a cavity at the other end thereof, and received in the rear leg so as to be movable between a first position where the protrusion is retreated inside the rear leg and a second position where the protrusion is protruded outside the rear leg; and a spring provided in the cavity of the lockup member for biasing the lockup member towards the second position, wherein when the frame is in the collapsed position, the rear leg can be fixed with respect to the joint by the lockup member biased toward the second position by the spring so that the protrusion of the lockup member abuts against the joint, and the rear leg can be released to rotate freely with respect to the joint by moving the lockup member from the second position to the first position against a biasing force of the spring so that the frame can be moved from the collapsed position to the operating position.

According to the preferred embodiment of the invention, the joint is approximately formed in a triangular shape including a closed first side, an opened second side, and a third side having a circular hole and a notch.

According to the preferred embodiment of the invention, the joint has an inner thickness adapted for receiving the handle bar and the rear leg.

According to the preferred embodiment of the invention, a pull tab is extended from the protrusion and provided with a ring putting around the outer surface of the rear leg.

BRIEF DESCRIPTION OF THE DRAWINGS

Other objects and advantages of the invention will become apparent from a study of the following description of a preferred embodiment of the invention when viewed in the light of the accompanying drawings, in which.

DETAILED DESCRIPTION OF THE PREFERRED EMBODIMENT

Figure 1:
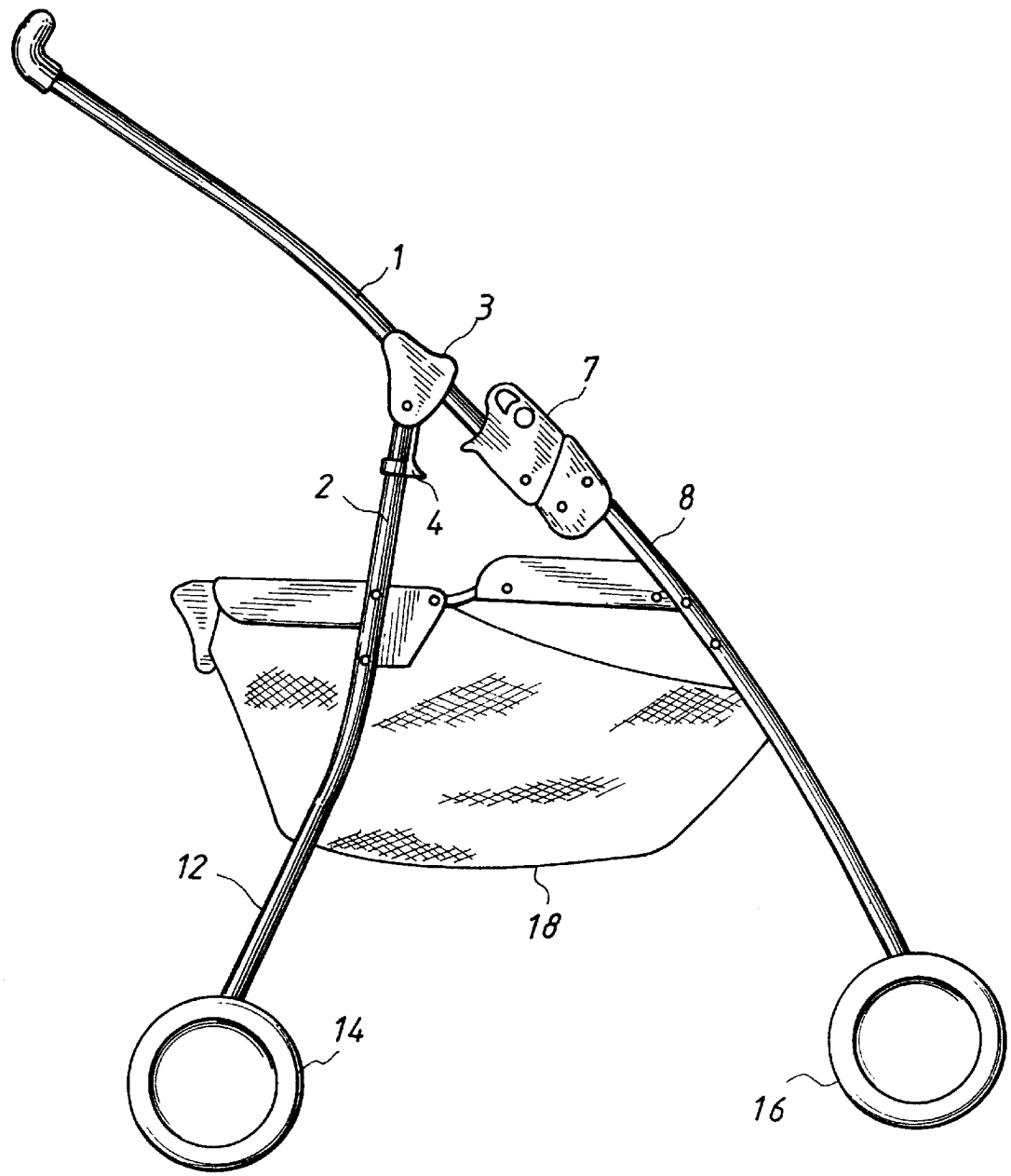
FIG. 1 is a side plan view of an infant stroller having a lockup mechanism according to an embodiment of the invention.

Referring initially to FIG. 1, there is shown a stroller including a lockup mechanism according to a preferred embodiment of the invention. The stroller can be any standard stroller and includes a seat 18 mounted on a frame 12 which is supported by wheels 14 and 16. The frame 12 includes a handle bar 1, two front leg 8 and two rear legs 2, wherein each of the two rear legs 2 is connected with the handle bar 1 by a joint 3. A latch 7 is provided at each end of the handle bar 1.

Figure 2:
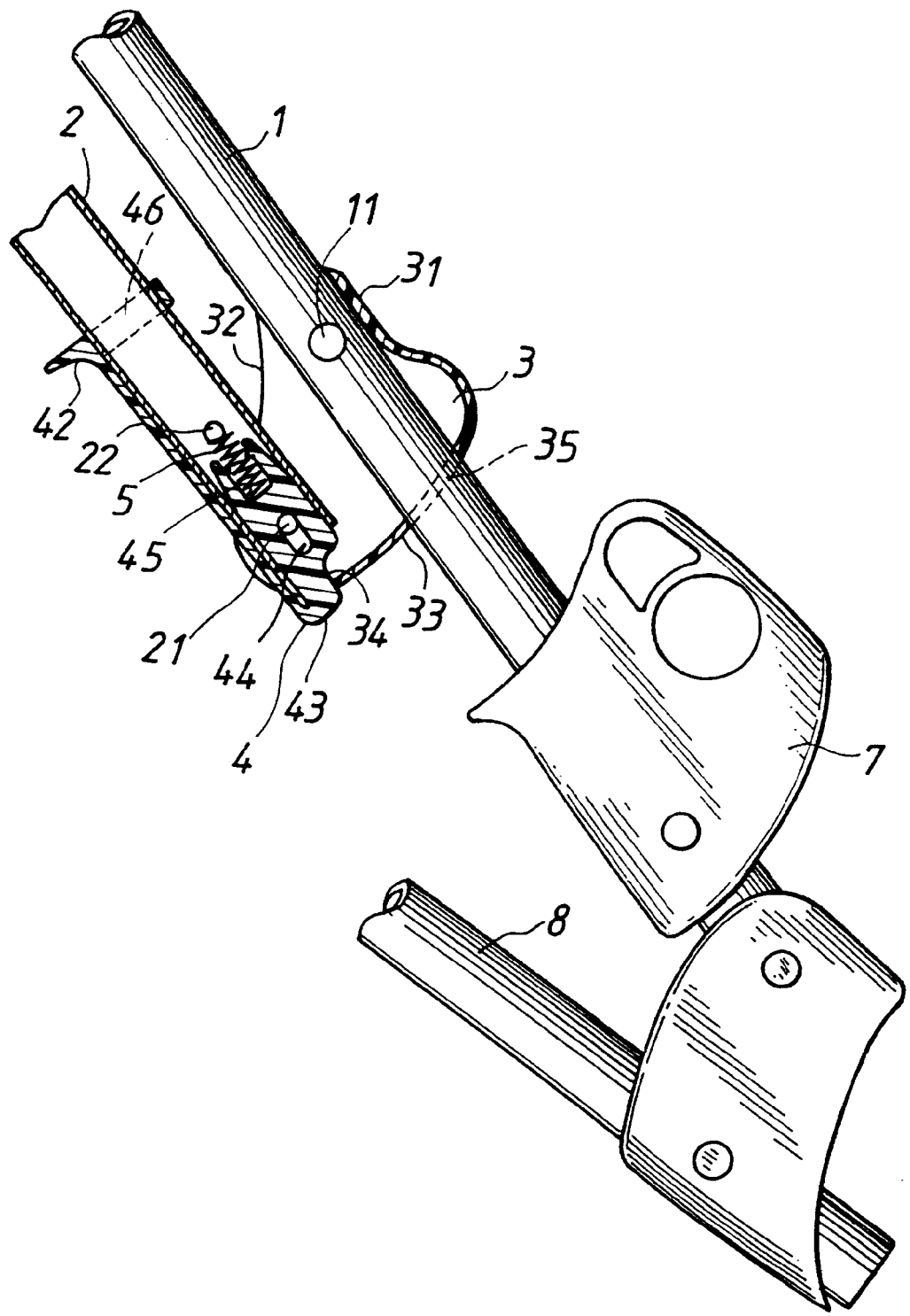
FIG. 2 is an enlarged side view of the lockup mechanism of FIG. 1 when the infant stroller is in the collapsed position and the lockup mechanism is the second position.
Figure 3:
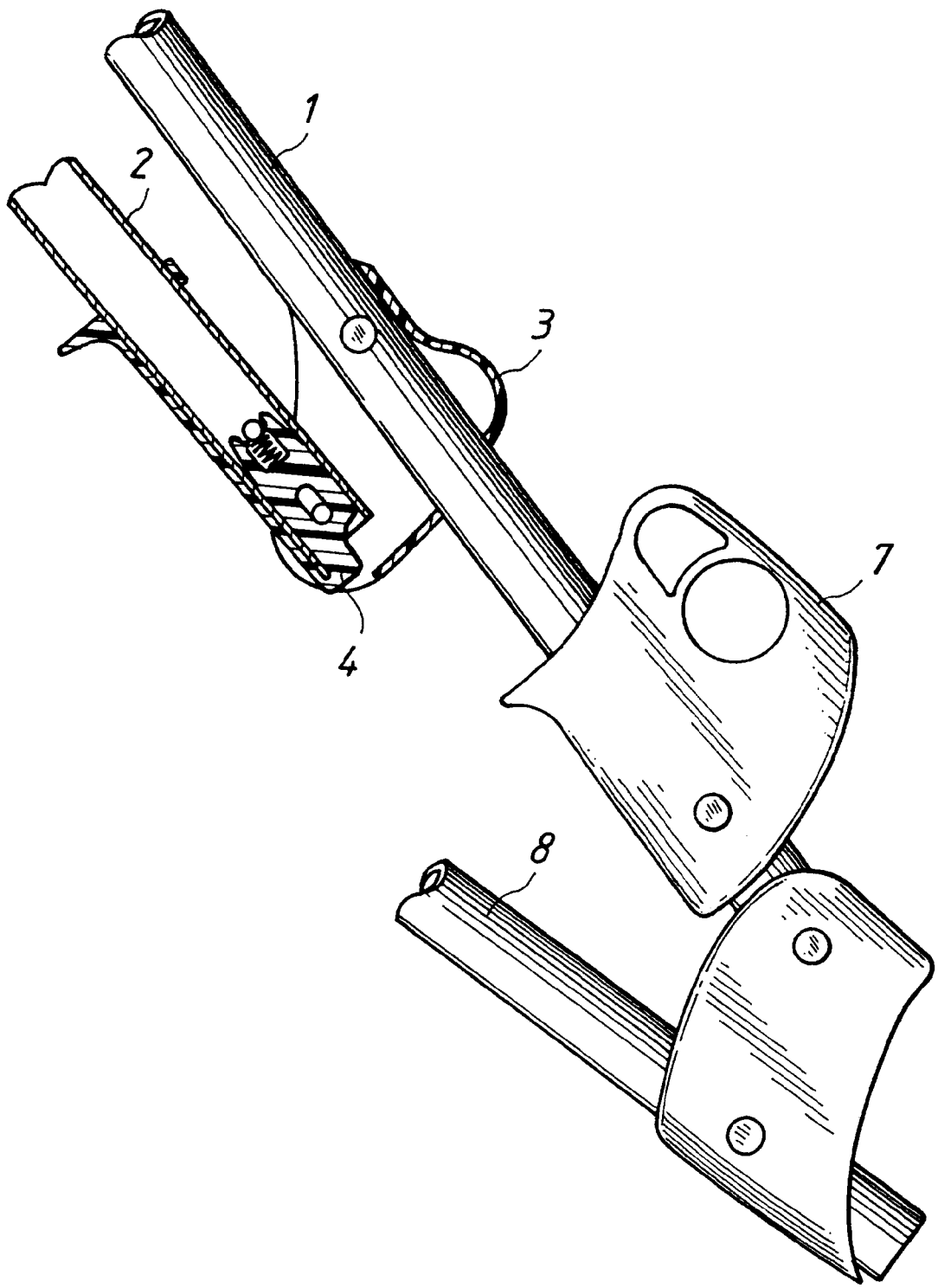
FIG. 3 is an enlarged side view of the lockup mechanism of FIG. 1 when the infant stroller is in the collapsed position and the lockup mechanism is the first position.
Figure 4:
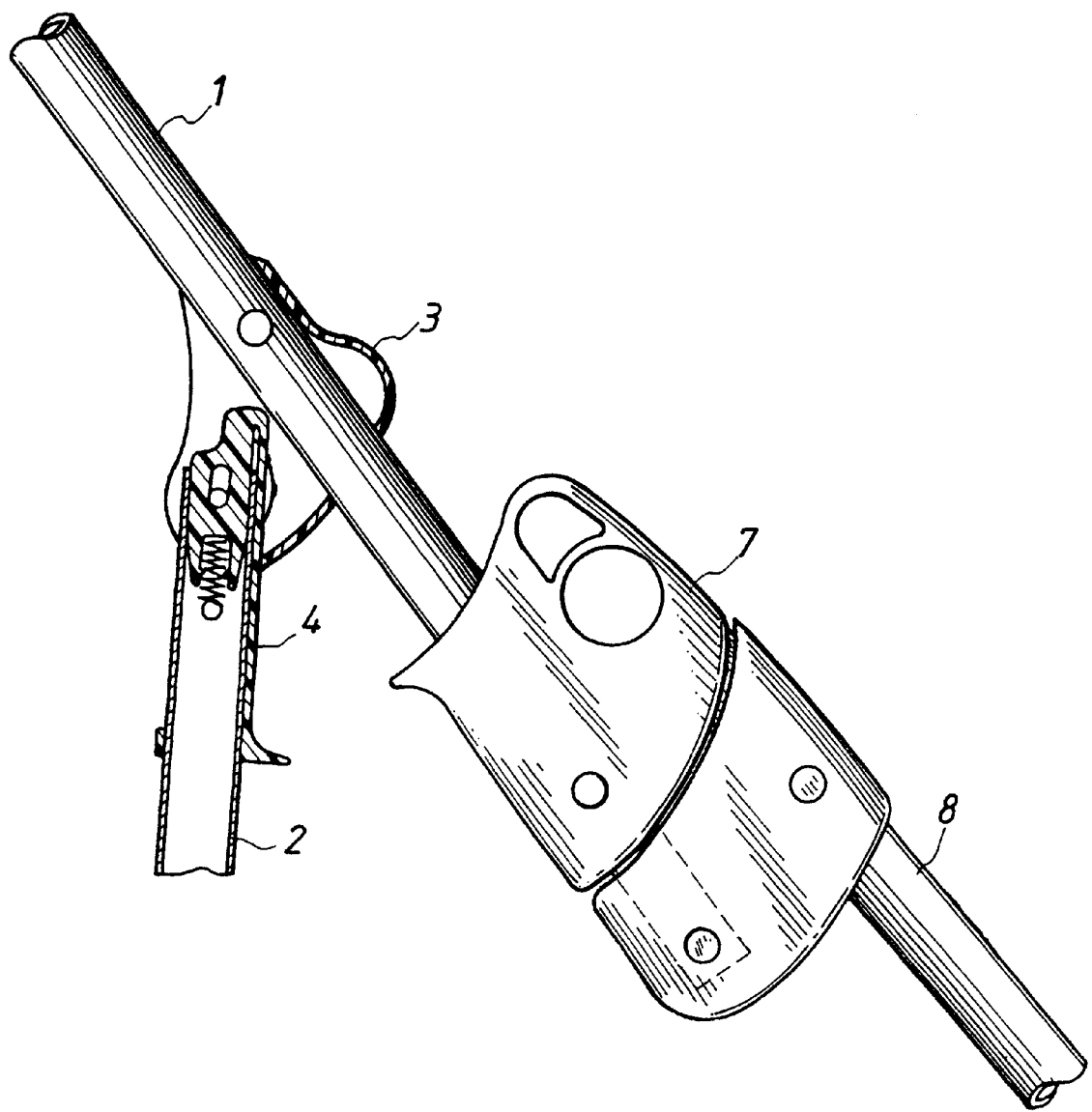
FIG. 4 is an enlarged side view of the lockup mechanism of FIG. 1 when the infant stroller is in the operating position.
Figure 5:
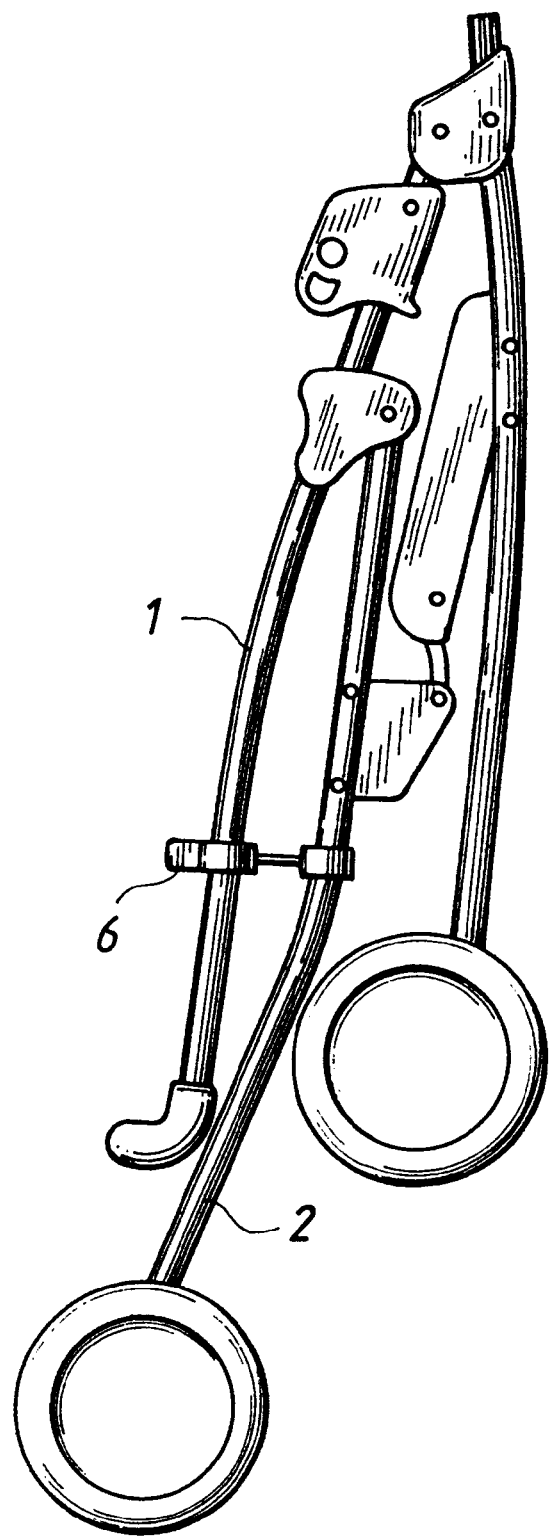
FIG. 5 is a side plan view of the infant stroller in the collapsed position with a conventional fixing member to be fixed on the handle bar and the rear leg.

Referring now to FIGS. 2, 3 and 4, the lockup mechanism will be described in greater detail. Each of the joints 3 is proximately formed in a triangular shape including a closed first side 31, an opened second side 32 and a third side 33 having a circular hole 35 and a notch 34, and with an inner thickness adapted for receiving the handle bar 1 and the rear leg 2, wherein the handle bar 1 is received against the inside surface of the first side 31 through the circular hole 35 and fixed by a first fixing element 11, and each of the rear legs 2 is received in a corner of the second and third sides 32 and 33 and pivotally connected by a second fixing element 21.

As shown in FIG. 2, the lockup mechanism can be provided on one or both of the joints 3. The lockup mechanism includes a lockup member 4 slidingly received in the rear leg 2. The lockup member 4 has a slot 44 for the second fixing element 21 to pass through so as to be moved between a first position, as shown in FIG. 3 and a second position, as shown in FIG. 2.

The lockup member 4 further includes at one end thereof a protrusion 43, and at other end thereof a cavity 45 for receiving a spring 5, one end of which is pressed against the bottom of the cavity 45 and the other end is stopped by a stopper 22. Furthermore, the lockup member 4 includes a pull tab 42 extending from the protrusion 43 and provided with a ring 46 putting around the outer surface of the rear leg 2.

As shown in FIG. 2, the frame 12 is completely in the collapsed position, while the protrusion 43 is in the second position where the protrusion 43 protruded outside the rear leg 2 and is abutted against the edge of the notch 34 by a resilient force applied by the spring 5. In this case, the frame 12 is secured in the collapsed position.

Furthermore, in order for the frame 12 to be moved from the collapsed position to the operating position, the lockup member 4 has to be moved in the first position, as shown in FIG. 3, by pulling the pull tab 42 towards the end of the rear legs 2 connected with the wheels 14 till the protrusion 43 is withdrawn back inside the rear leg 2. Then, FIG. 4 illustrates that the frame 12 is right in the operating position and the latches 7 become in the locked position.

Conversely, if a user wishes to move the frame 12 from the operating position to the collapsed position, then the latches 7 are released and the lockup member 4 is moved to the first position.

While in the above the present invention has been described in relation to the preferred embodiment and many details have been set forth for purpose of illustration, it will be apparent to those skilled in the art that the present invention is susceptible to additional embodiments and that certain of the details described herein can be varied considerably without departing from the basic principles of the present invention.

What is claimed is:

1. A lockup mechanism for an infant stroller, the infant stroller including a frame movable between a collapsed position and an operating position, wheels connected with the frame, and a seat connected with the frame for supporting an infant, the frame including a handle bar, two front legs and two rear legs, wherein each of the two rear legs is pivotably connected to the handle bar by a joint, said lockup mechanism being provided to operate between the joint and the rear leg and comprising:

a lockup member having a protrusion at one end thereof and a cavity at the other end thereof, and received in the rear leg so as to be movable between a first position where the protrusion is retreated inside the rear leg and a second position where the protrusion is protruded outside the rear leg; and a spring provided in the cavity of the lockup member for biasing the lockup member towards the second position, wherein when the frame is in the collapsed position, the rear leg can be fixed with respect to the joint by the lockup member biased towards the second position by the spring so that the protrusion of the lockup member abuts against the joint, and the rear leg can be released to rotate freely with respect to the joint by moving the lockup member from the second position to the first position against a biasing force of the spring so that the frame can be moved from the collapsed position to the operating position.

2. A lockup mechanism for an infant stroller as defined in claim 1, wherein the joint is substantially of a hollow triangular shape including a closed first side an opened second side, and a third side having a circular hole and a notch, and the notch abuts against the protrusion of the lockup member when the frame is secured in the collapsed position.

3. A lockup mechanism for an infant stroller as defined in claim 1, wherein the joint has an inner thickness adapted for receiving the handle bar and the rear leg.

4. A lockup mechanism for an infant stroller as defined in claim 1, further comprising a pull tab extending from the protrusion along outside the rear leg and provided with a ring around the outer surface of the rear leg.

* * * * *